United States Patent [19]

Oyama et al.

[11] 4,421,884
[45] Dec. 20, 1983

[54] OIL-RESISTANT RUBBER COMPOSITION

[75] Inventors: Motofumi Oyama, Yokosuka; Kinro Hashimoto, Yokohama, both of Japan

[73] Assignees: Nippon Zeon Co. Ltd., Tokyo; Toyota Jidosha Kabushiki Kaisha; Toyoda Gosei Co. Ltd., both of Aichi, all of Japan

[21] Appl. No.: 405,025

[22] Filed: Aug. 4, 1982

[30] Foreign Application Priority Data

Aug. 11, 1981 [JP] Japan ................................. 56-125681

[51] Int. Cl.$^3$ ................................................ C08L 9/02
[52] U.S. Cl. ................................... 524/209; 525/234; 525/315
[58] Field of Search ................ 524/209; 525/235, 315

[56] References Cited

U.S. PATENT DOCUMENTS 4,136,077  1/1979  Williams et al. .................... 524/209

FOREIGN PATENT DOCUMENTS 50-94063  7/1975  Japan ................................. 524/209

*Primary Examiner*—Allan Lieberman
*Attorney, Agent, or Firm*—Sherman & Shalloway

[57] ABSTRACT

An oil-resistant rubber composition comprising 98 to 50 parts by weight of (1) a partially hydrogenated unsaturated nitrile/conjugated diene copolymer rubber in which at least 50% of units derived from the conjugated diene are hydrogenated, and 2 to 50 parts by weight of (2) a liquid copolymer having a number average molecular weight of 500 to 10,000 obtained by copolymerizing 10 to 80% by weight of a conjugated diene, 10 to 70% by weight of an unsaturated nitrile and 0 to 20% by weight of a vinyl monomer copolymerizable with these monomers, the total amount of the components (1) and (2) being 100 parts by weight.

4 Claims, No Drawings

OIL-RESISTANT RUBBER COMPOSITION

This invention relates to an oil-resistant rubber composition having excellent solvent crack resistance comprising a partially hydrogenated unsaturated nitrile/conjugated diene copolymer rubber and a liquid unsaturated nitrile/conjugated diene copolymer.

Generally, a phenomenon in which a polymeric substance develops cracks on contact with a solvent and the cracks then grow is known as solvent crack. It is often observed that when a vulcanized rubber comes into contact with solvent, it undergoes breakage within a short period of time even at such a low stretch which in the air would not easily break it. The occurrence of this phenomenon is a particularly serious problem with rubber component parts of automobiles, especially fuel hoses used in contact with gasoline, from the viewpoint of safety.

With a social demand for lead-free gasoline in recent years, the proportion of aromatic components in gasoline has been increased to increase its octane number. Rubber materials composed mainly of an acrylonitrile/butadiene copolymer rubber are liable to undergo solvent crack upon contact with such gasoline, and this has created a problem in practical applications. In an attempt to solve this problem, various rubber compositions having improved solvent crack resistance have been suggested. A typical example is an oil-resistant rubber composition comprising a liquid copolymer obtained by copolymerizing acrylonitrile, butadiene (and/or isoprene) and an α,β-unsaturated carboxylic acid and an acrylonitrile/butadiene copolymer rubber in (U.S. Pat. No. 3,790,646), which exhibits a particularly marked effect and is in commercial use.

There has been a worldwide movement toward obtaining energy from a multiplicity of resources by saving petroleum consumption and utilizing other natural resources. As one means of achieving this purpose, the use of a mixture of gasoline with an alcohol such as methanol or ethanol has been investigated in many countries of the world for use as automobile fuel, and it has already been put to practical use in America and Brazil. A typical new fuel is a mixture of gasoline and ethanol, which is called gasohol.

Our experimental work has shown that the rubber composition of the above-cited U.S. Patent comprising the acrylonitrile-butadiene copolymer and the liquid copolymer does not exhibit solvent crack resistance and is useless when used in contact with gasohol.

It is an object of this invention therefore to provide an oil-resistant rubber composition having excellent solvent crack resistance when used in contact with gasoline, particularly gasohol and various solvents such as aromatic solvents and alcohols.

According to this invention, there is provided as an oil-resistant rubber composition meeting this object, a composition comprising 98 to 50 parts by weight of (1) a partially hydrogenated unsaturated nitrile/conjugated diene copolymer rubber in which at least 50% of units derived from the conjugated diene are hydrogenated, and 2 to 50 parts by weight of (2) a liquid copolymer having a number average molecular weight of 500 to 10,000 obtained by copolymerizing 10 to 80% by weight of a conjugated diene, 10 to 70% by weight of an unsaturated nitrile and 0 to 20% by weight of a vinyl monomer copolymerizable with these monomers, the total amount of the components (1) and (2) being 100 parts by weight.

Since the composition of this invention also has excellent heat aging resistance in addition to its excellent solvent resistance, it also fully exhibits oil resistance and heat resistance under severe conditions, the properties which have been strongly required in recent years.

The partially hydrogenated unsaturated nitrile/conjugated diene copolymer rubber (1) used in this invention can be obtained by hydrogenating the conjugated diene units of an unsaturated nitrile/conjugated diene copolymer rubber produced by emulsion polymerization, solution polymerization, etc., by an ordinary hydrogenating method (for example, the methods described in British Pat. Nos. 1,198,195 and 1,558,491).

The copolymer rubber to be hydrogenated includes, for example, a copolymer rubber prepared from at least one unsaturated nitrile such as acrylonitrile or methacrylonitrile and at least one conjugated diene such as 1,3-butadiene, isoprene and 1,3-pentadiene; and a copolymer rubber prepared from an unsaturated nitrile, a conjugated diene and an unsaturated carboxylic acid ester (e.g., a methyl-, butyl- or 2-ethylhexyl-ester of acrylic, methacrylic, fumaric or itaconic acid) or an N-methylol alkylamide (such as N-methylol acrylamide). Specific examples are an acrylonitrile/butadiene copolymer rubber, an acrylonitrile/isoprene copolymer rubber, an acrylonitrile/butadiene/isoprene copolymer rubber, and an acrylonitrile/butadiene/methyl acrylate copolymer rubber. The acrylonitrile/butadiene copolymer rubber is especially preferred.

There is no particular restriction on the amount of the bound unsaturated nitrile in the copolymer rubber. Usually, it is 10 to 60% by weight, and can be determined depending upon the end use of the final composition or its state of use (in other words, depending upon the solvent with which it is to be contacted).

The degree of hydrogenation of the conjugated diene units in the copolymer rubber is at least 50%, preferably at least 70%. If it is less than 50%, only a slight improvement can be achieved in solvent crack resistance and heat resistance. If it exceeds 98%, however, vulcanization of the resulting composition with sulfur becomes so slow that it is not practical. When, however, the cross-liking is carried out by using an organic peroxide, the conjugated diene units may be hydrogenated to a degree of 100%.

In order that the liquid copolymer (2) has good compatibility with the copolymer rubber (1) and the final composition of this invention exhibits excellent solvent crack resistance and strength properties, the liquid copolymer (2) used in this invention should be one obtained by copolymerizing 10 to 70% by weight, preferably 20 to 50% by weight, of an unsaturated nitrile, 20 to 80% by weight, preferably 25 to 75% by weight, of a conjugated diene and 0 to 20% by weight, preferably 0.1 to 15% by weight, of a vinyl monomer copolymerizable with these monomers.

Examples of the unsaturated nitrile and the conjugated diene are the same as those given above with regard to the partially hydrogenated copolymer rubber. Acrylonitrile is especially preferred as the unsaturated nitrile, and butadiene and isoprene are especially preferred as the conjugated diene. Examples of the vinyl monomer copolymerizable with the unsaturated nitrile and the conjugated diene include unsaturated carboxylic acids or their esters, such as acrylic acid, methacrylic acid, itaconic acid, methyl acrylate and methyl methacrylate; vinylpyridine monomers such as 2-vinylpyridine; and N-methylol ($C_{1-4}$ alkyl)amides such as N-methylol acrylamide. Acrylic acid and methacrylic acid are especially preferred.

The liquid copolymer (2) has a number average molecular weight of 500 to 10,000. If it is less than 500, the copolymer readily undergoes extraction with solvents, and improved solvent crack resistance cannot be obtained. It is exceeds 10,000, the solvent crack resistance of the resulting rubber composition is reduced. The preferred number average molecular weight is 1,000 to 5,000.

the liquid copolymer (2) can be easily obtained, for example, by using a large amount of a mercaptan such as t-dodecylmercaptan as a molecular weight modifier in a usual emulsion-polymerization process.

The rubber composition of this invention is obtained by mixing 98 to 50 parts by weight of the copolymer rubber (1) with 2 to 50 parts by weight of the liquid copolymer (2) so that the total amount of the polymers (1) and (2) is 100 parts by weight. If the amount of the liquid copolymer (2) is less than 2 parts by weight, no improvement in solvent crack resistance can be obtained. If it exceeds 50 parts by weight, the Mooney viscosity of the resulting composition is decreased and adversely affects such properties as compression set. These two components may be mixed in the state of latex, or in a solvent, or by means of a mixer such as a roll or Banbury mixer.

The rubber composition of this invention so prepared is vulcanized by usual methods such as sulfur cure or peroxide cure. Compounding ingredients usually employed in the rubber industry, such as reinforcing agents, fillers, softeners and antioxidants, may be added to the rubber composition of this invention in addition to a vulcanizer.

The rubber composition of this invention is very suitable for use in fuel hoses, steelmaking rolls, etc. which require solvent resistance and heat resistance, printing rolls, spinning rolls, papermaking rolls, dyeing rolls, etc. which require solvent resistance, and also as sealing materials such as oil seals, O-rings, diaphragms, and gaskets.

The following non-limitative examples illustrate the present invention specifically.

The degree of hydrogenation in each of the following examples was determined by an iodine value method.

REFERENTIAL EXAMPLE 1

Production of a partially hydrogenated unsaturated nitrile/conjugated diene copolymer rubber (1):

A 10-liter autoclave was charged with 1 kg of an acrylonitrile/butadiene copolymer rubber (to be abbreviated NBR) having a bound acrylonitrile content of 45% and a Mooney viscosity ($ML_{1+4}$, 100° C.) of 50 and 4 kg of acetone to dissolve the rubber. Then, 20 g of a catalyst containing 3 to 5% by weight of Pd supported on activated carbon (average particle diameter $3\mu$) was added. The inside of the autoclave was purged with nitrogen, and the copolymer was subjected to hydrogenation at a reaction temperature of 50° C. and a hydrogen pressure of 50 kg/cm² for a reaction period of 1 to 4 hours. In this manner, three samples of partially hydrogenated NBR having a degree of hydrogenation of 45%, 70% and 90% were prepared.

REFERENTIAL EXAMPLE 2

Production of a liquid copolymer (2):

In accordance with the polymerization recipe shown in Table 1, the monomers were reacted at 35° C. in a 10-liter autoclave until the conversion of the monomers reached at least 85%. After the reaction, a phenolic antioxidant was added to the resulting latex. The latex was coagulated with an aqueous sulfuric acid solution containing aluminum sulfate, washed with water, and dried in a vacuum dryer to give a liquid copolymer. The amount (% by weight) of bound acrylonitrile of the resulting copolymer was measured by the Kjeldahl's method, and its number average molecular weight, by ebulliometry. The properties of the resulting polymers are shown in Table 2.

TABLE 1

| Polymerization recipe | |
|---|---|
| Monomers (see Table 2) | 100 (parts by weight) |
| Water | 250 |
| Sodium dibutylnaphthalenesulfonate | 3.0 |
| Sodium dodecylbenzenesulfonate | 1.0 |
| Sodium sulfate | 0.2 |
| Sulfuric acid | 0.1 |
| Potassium persulate | 0.5 |
| t-Dodecylmercaptan | variable (see Table 2) |

TABLE 2

| | Polymerization conditions | | | | Properties of the liquid copolymer | |
|---|---|---|---|---|---|---|
| | Amounts of monomers charged (parts) | | | t-Dodecyl-mercaptane charged | Bound acrylonitrile (wt. %) | Number average molecular weight |
| Sample | Acrylonitrile | Butadiene | Methacrylic acid | | | |
| A | 42 | 54 | 4 | 10.0 | 40.6 | 2040 |
| B | 45 | 55 | 0 | 12.0 | 43.3 | 1930 |
| C | 45 | 52 | 3 | 11.0 | 43.5 | 1890 |
| D | 42 | 54 | 4 | 20.0 | 40.8 | 870 |
| E | 42 | 43 | 15 | 10.0 | 40.2 | 1910 |
| F | 33 | 54 | 3 | 3.5 | 31.0 | 5800 |
| G | 33 | 53* | 4 | 9.0 | 31.2 | 1870 |
| H | 33 | 52 | 5** | 9.0 | 31.3 | 2070 |

*Isoprene was used instead of butadiene.
**Acrylic acid was used instead of methacrylic acid.

EXAMPLE 1

Each of the three samples of partially hydrogenated NBR having a bound acrylonitrile content of 45% and a degree of hydrogenation at the butadiene units of 45%, 70% and 90% respectively obtained in Referential Example 1 was mixed with the liquid copolymer A obtained in Referential Example 2 on a cold roll in the proportions (parts by weight) described in Table 4. Then, in accordance with the compounding recipe in Table 3, various compounding ingredients were added and mixed to form a rubber compound stock. It was heated under pressure at 160° C. for 20 minutes to obtain a vulcanizate.

A vulcanizate was obtained in the same way as above except that NBR with a hydrogenation degree of 0% was used instead of the above partially hydrogenated NBR.

TABLE 3

| Rubber (indicated in Table 2) | 100 | (parts by weight) |
|---|---|---|
| Stearic acid | 1 | |
| Zinc oxide #3 | 5 | |
| Sulfur | 0.5 | |
| SRF carbon black | 80 | |
| Plasticizer [Di-(butoxyethoxyethyl) adipate] | 20 | |
| Tetramethylthiuram disulfide | 2 | |

| | |
|---|---|
| TABLE 3-continued | |
| 2-Mercaptobenzothiazole | 0.5 |
| N—phenyl-N'—isopropyl p-phenylenediamine | 1 |
| Octylated diphenylamine | 1 |

The properties of the vulcanizates were measured in accordance with JIS K-6301.

The solvent crack resistance was measured by the following method.

Two indicator lines were drawn at an interval of 20 mm at a central part of a rectangular test specimen having a width of 10 mm, a length of 100 mm and a thickness of 2 mm. Midway between the indicator lines, a cut with a width of 2 mm was provided parallel to the indicator lines and extending to the back of the specimen. This test specimen was secured to a jig capable of stretching the specimen to a desired length. Then, the specimen was stretched at a stretch ratio of 100%. The stretched specimen was dipped in a test solvent at 40° C. and the time which elapsed until the test specimen broke was measured.

The results are shown in Table 4.

TABLE 4

| | | Run No. | | | | | |
|---|---|---|---|---|---|---|---|
| | | Comparison | | | | Invention | |
| Test item | | 1 | 2 | 3 | 4 | 5 | 6 |
| Degree of | 0% | 100 | — | 80 | — | — | — |
| hydrogenation | 45% | — | — | — | 80 | — | — |
| of NBR | 70% | — | — | — | — | 80 | — |
| | 90% | — | 100 | — | — | — | 80 |
| Liquid copolymer A | | 0 | 0 | 20 | 20 | 20 | 20 |
| Properties of the vulcanizate | | | | | | | |
| Tensile strength (kg/cm$^2$) | | 147 | 168 | 126 | 123 | 117 | 125 |
| Elongation (%) | | 530 | 460 | 640 | 650 | 650 | 710 |
| 300% Tensile stress (kg/cm$^2$) | | 105 | 132 | 77 | 77 | 75 | 73 |
| Hardness (JIS) | | 62 | 70 | 57 | 59 | 62 | 65 |
| Resistance to heat aging (by the test tube method, 125° C. × 168 hrs.) | | | | | | | |
| Percent change of tensile strength (%) | | −8 | −5 | −9 | +2 | +6 | −6 |
| Percent change of elongation (%) | | −48 | −35 | −47 | −47 | −44 | −35 |
| Change of hardness (point) | | +9 | +4 | +10 | +9 | +6 | +4 |
| Solvent crack resistance (seconds) | | | | | | | |
| isooctane/toluene (50/50 by volume) | | 28 | 30 | 144 | 590 | 9,700 | 12,600 |
| isooctane/toluene/methanol (40/40/20 by volume) | | 8 | 7 | 17 | 45 | 270 | 305 |
| isooctane/toluene/ethanol (40/40/20 by volume) | | 8 | 15 | 43 | 86 | 490 | 485 |
| toluene | | 17 | 52 | 70 | 156 | 1,950 | 2,000 |
| acetone | | 5 | 11 | 20 | 26 | 204 | 220 |
| ethyl acetate | | 14 | 49 | 50 | 79 | 1,550 | 1,650 |
| trichloroethylene | | 11 | 24 | 39 | 48 | 460 | 470 |
| methanol | | 88 | 500 | 400 | 870 | Did not break even after 70,000 | |

The results given in Table 4 show that the compositions of this invention comprising the partially hydrogenated NBR and the unsaturated nitrile/conjugated diene liquid copolymer give oil-resistant vulcanized compositions which have markedly improved solvent crack resistance over those given by conventional compositions comprising NBR and unsaturated nitrile/conjugated diene liquid copolymers.

EXAMPLE 2

Each of two samples of partially hydrogenated NBR having a hydrogenation degree in the butadiene units of 90% by weight and containing 41% by weight and 50% by weight, respectively, of bound acrylonitrile was mixed with the liquid copolymer (A) prepared in Referential Example 2 on a cold roll to form a mixture (80:20 by weight). The various compounding ingredients according to the compounding recipe shown in Table 3 were mixed with the above mixture on a cold roll to form a rubber compound stock. The compound stock was heated under pressure at 160° C. for 20 minutes to form a vulcanizate.

Separately, a vulvanizate was obtained by operating in the same way as above except that NBR having a hydrogenation degree of 0% was used instead of the partially hydrogenated NBR.

These vulcanizates were tested in the same way as in Example 1. The results are shown in Table 5.

TABLE 5

| | Run No. | | | | | |
|---|---|---|---|---|---|---|
| | Comparison | | | | Invention | |
| Test item | 7 | 8 | 9 | 10 | 11 | 12 |
| NBR (BA 41; DH 0)* | 100 | | 80 | | | |
| NBR (BA 41; DH 90) | | 100 | | | 80 | |
| NBR (BA 50; DH 0) | | | | 80 | | |
| NBR (BA 50; DH 90) | | | | | | 80 |
| Liquid copolymer A | 0 | 0 | 20 | 20 | 20 | 20 |
| Properties of the vulcanizate | | | | | | |
| Tensile strength | 145 | 157 | 122 | 128 | 123 | 129 |
| Elongation (%) | 550 | 460 | 650 | 590 | 690 | 660 |
| 300% tensile stress (kg/cm$^2$) | 100 | 125 | 76 | 90 | 73 | 89 |
| Hardness (JIS) | 62 | 70 | 56 | 57 | 64 | 65 |
| Solvent crack resistance (seconds) | | | | | | |
| isooctane/toluene (50/50 by volume | 21 | 28 | 90 | 93 | 13,100 | 13,600 |
| isooctane/toluene/methanol (40/40/20 by volume) | 10 | 7 | 18 | 17 | 316 | 330 |
| isooctane/toluene/ethanol (40/40/20 by volume) | 9 | 8 | 14 | 34 | 370 | 484 |
| toluene | 15 | 30 | 63 | 90 | 2,050 | 2,200 |
| acetone | 4 | 10 | 20 | 23 | 225 | 237 |
| ethyl acetate | 12 | 37 | 48 | 50 | 1,600 | 1,670 |
| trichloroethylene | 11 | 23 | 35 | 40 | 470 | 500 |
| methanol | 87 | 460 | 460 | 490 | Did not break even after 70,000. | |

*BA stands for bound acrylonitrile, and DH stands for the degree of hydrogenation.

EXAMPLE 3

The partially hydrogenated NBR prepared in Referential Example 1 which contained 45% by weight of bound acrylonitrile and had a hydrogenation degree at the butadiene units of 90% was mixed with each of the liquid copolymers (B–H) prepared in Referential Example 2 on a cold roll in the proportions (parts by weight) shown in Table 6. The mixture was blended with the various compounding ingredients according to the compounding recipe shown in Table 3. Each of the resulting rubber compounds was heated under pressure at 160° C. for 20 minutes to form a vulcanizate.

Separately, a vulcanizate was obtained by operating in the same way as above except that NBR having a hydrogenation degree of 0% was used instead of the above partially hydrogenated NBR.

The solvent crack resistances of these vulcanizates were tested in the same way as in Example 1.

The results are shown in Table 6.

TABLE 6

| | Run No. | | | | |
|---|---|---|---|---|---|
| | Comparison | | Invention | | |
| Test item | 13 | 14 | 15 | 16 | 17 |
| NBR (degree of hydrogenation 0%) | 80 | 80 | | | |
| NBR (degree of hydrogenation 90%) | | | 80 | 80 | 90 |
| Liquid copolymer | (B) 20 | (C) 20 | (D) 20 | (B) 20 | (C) 10 |
| Properties of the vulcanizate | | | | | |
| Tensile strength (kg/cm$^2$) | 128 | 130 | 127 | 135 | 160 |
| Elongation (%) | 580 | 630 | 670 | 690 | 700 |
| 300% tensile stress (kg/cm$^2$) | 76 | 77 | 72 | 74 | 85 |
| Hardness (JIS) | 59 | 58 | 62 | 63 | 66 |
| Heat aging test (test tube method, 125° C. × 168 hrs) | | | | | |
| Percent change of tensile strength (%) | −9 | −10 | −5 | −1 | +5 |
| Percent change of elongation (%) | −49 | −48 | −39 | −35 | −26 |
| Change of hardness (point) | +9 | +10 | +6 | +5 | +5 |
| Solvent crack resistance (seconds) | | | | | |
| isooctane/toluene (50/50 by volume) | 51 | 125 | 4,530 | 5,380 | 10,800 |
| isooctane/toluene/methanol (40/40/20 by volume) | 11 | 16 | 238 | 167 | 264 |
| isooctane/toluene/ethanol (40/40/20 by volume) | 21 | 39 | 442 | 288 | 450 |
| toluene | 18 | 65 | 940 | 1,100 | 1,850 |
| acetone | 6 | 18 | 135 | 158 | 203 |
| ethyl acetate | 20 | 46 | 1,140 | 1,320 | 1,540 |
| trichloroprene | 14 | 35 | 386 | 423 | 461 |
| methanol | 196 | 365 | Did not break even after 70,000 | | |

| | Run No. | | | | |
|---|---|---|---|---|---|
| | Invention | | | | |
| Test item | 18 | 19 | 20 | 21 | 22 |
| NBR (degree of hydrogenation 0%) | | | | | |
| NBR (degree of hydrogenation 90%) | 70 | 60 | 70 | 70 | 70 |
| Liquid copolymer | (C) 30 | (E) 40 | (F) 30 | (G) 30 | (H) 30 |
| Properties of the vulcanizate | | | | | |
| Tensile strength (kg/cm$^2$) | 122 | 117 | 123 | 122 | 129 |
| Elongation (%) | 700 | 770 | 680 | 650 | 710 |
| 300% tensile stress (kg/cm$^2$) | 70 | 68 | 72 | 74 | 72 |
| Hardness (JIS) | 61 | 56 | 62 | 60 | 59 |
| Heat aging test (test tube method, 125° C. × 168 hrs) | | | | | |
| Percent change of tensile strength (%) | −6 | −6 | +1 | −3 | −4 |
| Percent change of elongation (%) | −39 | −41 | −37 | −38 | −35 |
| Change of hardness (point) | +6 | +7 | +5 | +6 | +7 |
| Solvent crack resistance (seconds) | | | | | |
| isooctane/toluene (50/50 by volume) | 12,700 | 12,700 | 10,700 | 9,600 | 12,700 |
| isooctane/toluene/methanol (40/40/20 by volume) | 296 | 287 | 295 | 260 | 286 |
| isooctane/toluene/ethanol (40/40/20 by volume) | 491 | 485 | 470 | 435 | 475 |
| toluene | 2,000 | 2,050 | 1,950 | 1,850 | 2,100 |
| acetone | 230 | 236 | 212 | 206 | 220 |
| ethyl acetate | 1,650 | 1,700 | 1,650 | 1,620 | 1,660 |
| trichloroprene | 478 | 482 | 472 | 459 | 493 |
| methanol | Did not break even after 70,000 | | | | |

What we claim is:

1. An oil-resistant rubber composition comprising 98 to 50 parts by weight of (1) a partially hydrogenated unsaturated nitrile/conjugated diene copolymer rubber in which at least 50% of units derived from the conjugated diene are hydrogenated, and 2 to 50 parts by weight of (2) a liquid copolymer having a number average molecular weight of 500 to 10,000 obtained by copolymerizing 10 to 80% by weight of a conjugated diene, 10 to 70% by weight of an unsaturated nitrile and 0 to 20% by weight of a vinyl monomer copolymerizable with these monomers, the total amount of the components (1) and (2) being 100 parts by weight.

2. The composition of claim 1 wherein the amount of bound nitrile in the copolymer rubber (1) is 10 to 60% by weight.

3. The composition of claim 1 or 2 wherein the degree of hydrogenation of the copolymer rubber (1) is at least 70%.

4. The composition of claim 1 wherein the liquid copolymer (2) has a number average molecular weight of 1,000 to 5,000.

* * * * *